Feb. 13, 1951 E. LABIN ET AL 2,541,076

MULTICHANNEL PULSE COMMUNICATING SYSTEM

Filed Aug. 7, 1944 3 Sheets-Sheet 1

INVENTORS
EMILE LABIN
DONALD D. GRIEG

BY Percy P. Lantzy
ATTORNEY

Feb. 13, 1951 E. LABIN ET AL 2,541,076

MULTICHANNEL PULSE COMMUNICATING SYSTEM

Filed Aug. 7, 1944 3 Sheets-Sheet 2

TRANSMISSION AT WEST TERMINAL

INVENTORS
EMILE LABIN
DONALD D. GRIEG

BY Percy P. Lantzy

ATTORNEY

Feb. 13, 1951 E. LABIN ET AL 2,541,076

MULTICHANNEL PULSE COMMUNICATING SYSTEM

Filed Aug. 7, 1944 3 Sheets-Sheet 3

INVENTORS
EMILE LABIN
DONALD D. GRIEG

BY Percy P. Lantzy
ATTORNEY

Patented Feb. 13, 1951

2,541,076

UNITED STATES PATENT OFFICE 2,541,076

MULTICHANNEL PULSE COMMUNICATING SYSTEM

Emile Labin, New York, and Donald D. Grieg, Forest Hills, N. Y., assignors to Federal Telephone and Radio Corporation, New York, N. Y., a corporation of Delaware Application August 7, 1944, Serial No. 548,368

2 Claims. (Cl. 179—15)

This invention relates to multi-channel communicating systems and more particularly to multi-channel transmission and reception of time modulating pulses.

One of the objects of this invention is to provide a multi-channel transmitter and method for either multi-channel communication between two terminals or for multi-channel broadcasting from a given station for selective reception by individual receivers.

Another object of the invention is to provide an improved multi-channel transmitting and/or receiving system, wherein the pulses of one channel are distinguished from the pulses of other channels for synchronizing the receiving equipment, and the pulses of the other channels are time modulated with respect to a given timing such, for example, as represented by the time positions of the pulses of the synchronizing channel.

In most multi-channel communicating systems employing pulse modulation, the channels are timed differently by utilizing a single source of sinusoidal wave, the energy of which is differently phased for the different channels. According to a feature of our invention, a single source of pulses which may or may not be produced from a wave source, is employed as the base energy for the different channels, the base pulse energy being retarded different amounts for the different channels. The pulses of each channel are time modulated according to the instantaneous value of intelligence to be transmitted. One of the channels is preferably reserved as a synchronizing channel, the pulses thereof being distinguished by a shape characteristic, such as width, from the pulses of the other channels. At the receiver the pulses of the synchronizing channel are separated from the other pulses and energy thereof is retarded different amounts for use as deblocking energy for the different channels. The time displacements of the pulses of each channel are then translated into amplitude displacements by any suitable time demodulator which, if desired, may follow the demodulating principles set forth in U. S. Patent No. 2,416,306 of D. D. Grieg, issued February 25, 1947, for "Demodulators." The principles of demodulation set forth in this copending application are discussed briefly hereinafter.

A further feature of importance in the present invention is the provision of pulse retardation means for not only producing interleaved pulses for a plurality of channels but also for selective retardation of the synchronizing pulses at receivers for selective reception of the different channels. For two-way transmission a single retardation means is used at a given terminal for both transmission and reception control of a plurality of channels.

Figure 1:
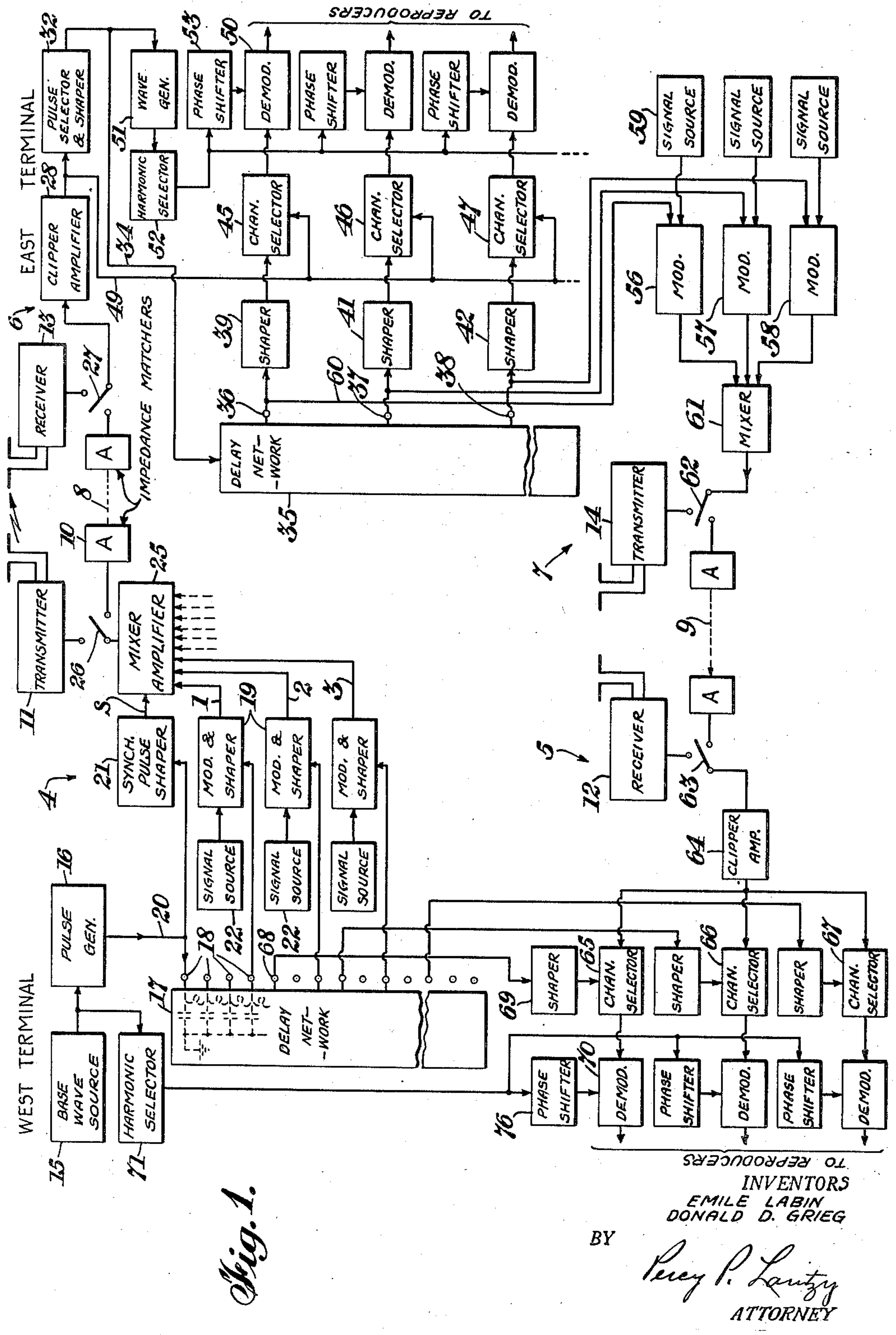
Figure 2:
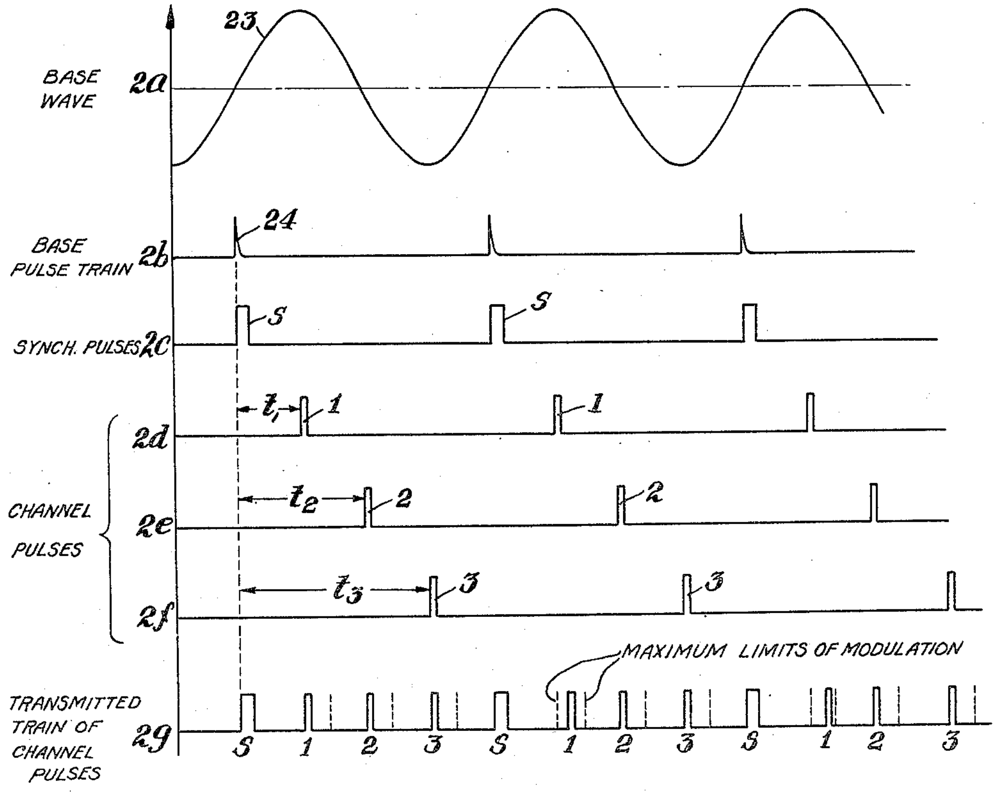
Figure 3:
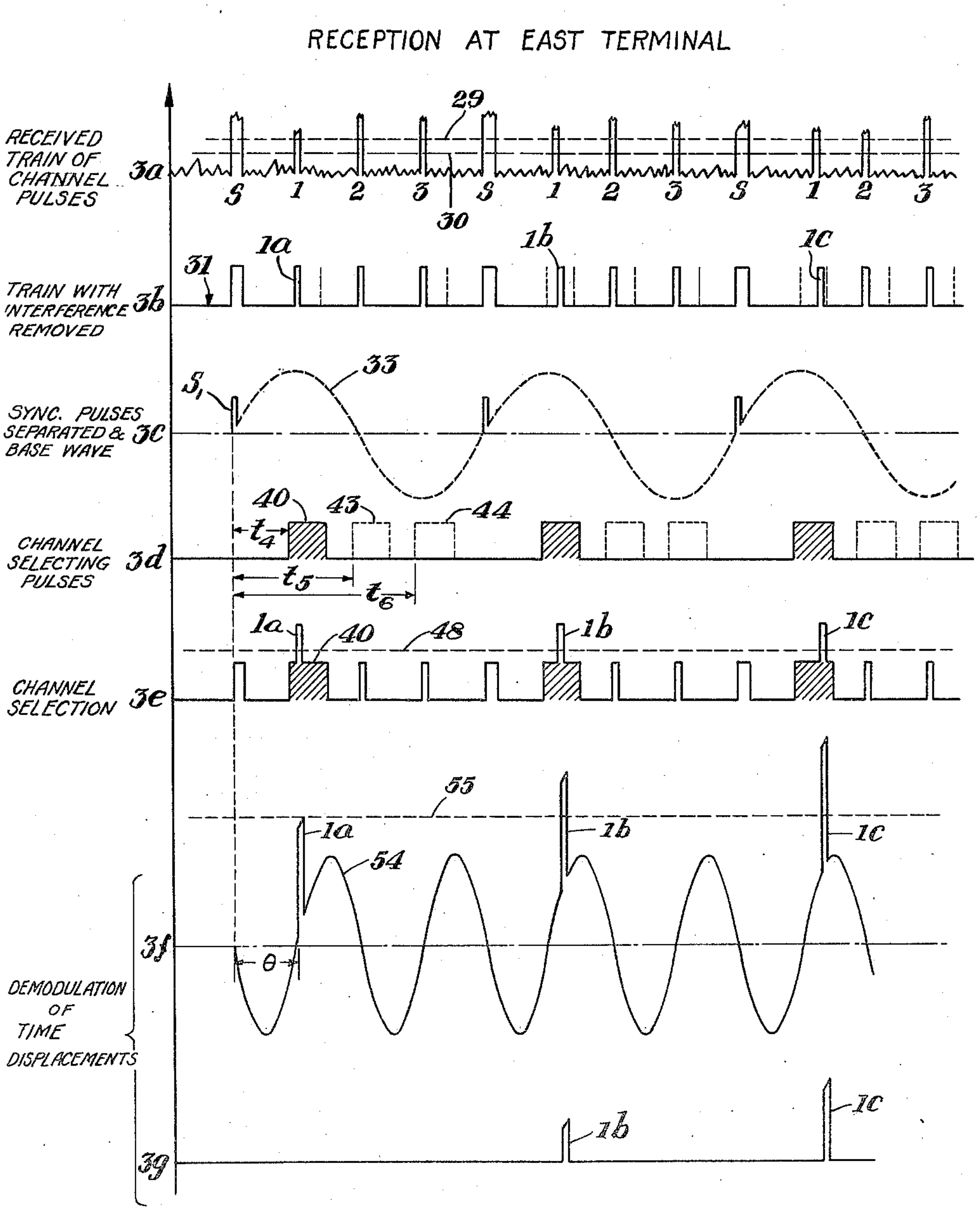

For a further understanding of the objects and features of our invention reference is made to the following detailed description to be read in connection with the accompanying drawings, in which:

Fig. 1 is a schematic block diagram of a multi-channel transmitting and receiving system according to the principles of our invention; and Figs. 2 and 3 are graphical illustrations used in explaining the transmitting and receiving operations, respectively, of the system of Fig. 1.

Referring to Fig. 1, two terminals, west and east, are shown illustrating diagrammatically the equipment for two-way communication. For simplicity the system is shown for three channels, 1, 2 and 3, the provision for any additional channels that may be desired being indicated in broken lines. The west terminal includes a multi-channel transmitter 4 and a multi-channel receiver 5. The east terminal includes a multi-channel receiver 6 and a multi-channel transmitter 7. For line communication between terminals, coaxial cable, dielectric wave guide or any other direct transmission medium may be employed as indicated at 8 and 9, such lines, of course, being provided with the proper impedance matching amplifiers 10. Instead of the transmission lines, radio links may be employed as indicated by the carrier transmitter 11 and carrier receiver 12 for the west terminal and carrier transmitter 13 and carrier receiver 14 for the east terminal. In the case of radio links, two different carrier frequencies are employed for the two-way transmission, and if desired directional antennas may be used.

When the invention is used for broadcasting purposes, the broadcasting station, such as may be represented by the west terminal, includes transmitting equipment having a transmitter provided with an omni-directional antenna, the receivers being provided in various locations with respect to such stations. The reception may be selective as to the channels or it may involve the simultaneous reception of two or more channels for aural or multi-channel reception. Such individual receivers include the necessary equipment of the multi-channel receiver 6 for receiving one or more channels, as the case may be. The individual receivers may be made selective by means of an adjustable delay device similar to that disclosed in U. S. Patent No. 2,485,611 of E. Labin et al. issued October 25, 1949, for "Broadcasting Systems."

The multi-channel transmitter 4 is shown to include a base wave source 15 which may comprise any known type of stable oscillator and a pulse generator 16 of known type capable of generating a train of evenly spaced narrow width pulses from the wave of such source. To insure stability during changes in temperature, the oscillator of source 15 may be temperature controlled. The pulse output of the generator 16 is applied to a delay network 17 having output connections 18 spaced at different retardation points therealong, whereby pulse energy may be supplied at different time intervals in the order of microseconds or of fractions thereof. Certain of the output connections 18 are connected to channel modulators and shaper circuits 19 for providing a plurality of channels, the time interval therebetween being selected, for example, about 2 or 3 micro-seconds more or less as may be desired, depending upon pulse width, maximum time displacement of modulation and the guard interval between the pulses of adjacent channels. The input connection 20, for example, is applied to a synchronizing pulse shaper 21 arranged to give the pulses applied thereto a given shape distinguished from the shape characteristics of the pulses of other channels. This shaping may involve a distinction in width, steepness of the leading and/or trailing edges of the pulse or some other shape distinguishing characteristic, such as a combination of two or more shape characteristics. For purposes of illustration, the pulses S corresponding to this channel are shown in graph 2*g* of Fig. 2 to be of a duration (width) greater than the pulses of other channels. The width of the synchronizing pulses preferably is about twice the width of the pulses of the other channels.

It will be recognized that this pulse width shaping may not necessarily be performed by the shaper 21, the required width of the synchronizing pulse being the same as the pulses produced by generator 16. In such case, the pulses applied to the other channels will of course, be shaped differently before, during or after the modulating operation so as to be distinguished therefrom.

The width shaper 21 may be of any known type of pulse shaping circuit, such, for example, as a flip-flop type of multi-vibrator arranged to be triggered by the pulses from generator 16 from one mode of operation to a second and to return to the first mode of operation after a predetermined lapse of time. The shaper 21 may also include clipper circuits for further shaping the output pulses of the multi-vibrator.

For the other channels, audio signals of sources 22 are applied to pulse modulator and shapers 19 which receive their base energy from selected ones of the output connections 18 of the delay network 17. The modulator-shapers 19 may comprise any suitable type of pulse time modulator and shaper circuit. By way of example, the modulator-shaper circuit may include the multi-vibrator-differentiator-clipper principles of the United States patent to E. M. Deloraine et al. No. 2,262,838 or it might include the pulse shaping and gate clipping and differentiating principles of U. S. Patent No. 2,434,936 of E. Labin et al. issued January 27, 1948, for "Modulation System."

Referring to Fig. 2, the graph 2*a* shows a sinusoidal wave 23 which represents the base wave produced at source 15. Graph 2*b* shows a train of narrow width pulses 24 representing the pulses produced by generator 16. The graph 2*c* shows a train of synchronizing pulses 8 which is produced from the train of pulses 24 by the pulse shaper 21, the shaper being arranged to produce the synchronizing pulses of a given width different from the pulse width of the pulses of the other channels. Graphs 2*d*, 2*e* and 2*f* show trains of pulses for channels 1, 2 and 3 respectively, the pulses thereof being delayed with respect to the time positions of pulses 24 and S by intervals $t_1$, $t_2$ and $t_3$, whereby the pulses of the synchronizing channel and those of channels 1, 2 and 3 are interleaved together into a single train as represented by graph 2*g*. The interleaving of pulses of the different channels takes place in a mixer amplifier 25 of known type, the output of which may be applied to the transmission medium 8 or to the carrier transmitter 11 depending upon the position of switch 26.

At the east terminal the train of channel pulses such as illustrated by the graph 2*g* is applied through switch 27 to the selective receiver circuits, from line 8 or carrier receiver 13, as the case may be. The received wave train is illustrated in graph 3*a* of Fig. 3. The pulse train is shown to include interference which varies the amplitudes of the pulses and introduces interference fluctuations in the intervals between pulses. The interference is removed from the train of channel pulses by applying the train of pulses to a clipper amplifier 28 of the double level clipping type whereby pulse energy between levels 29 and 30 only is passed. This results in a pulse train 31 (graph 3*b*) wherein the pulses are of equal amplitude and substantially all interference has been removed. Where line transmission is employed, the clipper amplifier 28 may be omitted. The pulses according to graph 3*b* are applied to a pulse selector and shaper 32 which may be of any known character capable of discriminating between pulses of two different widths. If desired, a pulse width discriminator of the character disclosed in U. S. Patent No. 2,440,278 of E. Labin et al. issued April 27, 1948, for "Wave Translator" may be employed. This width discriminator includes a resonant circuit which is shock-excitable in response to the leading and trailing edges of the pulses and a damping circuit having a vacuum tube connected across the resonant circuit for damping out the oscillatory energy following one or two undulations, as the case may be. The output from the circuit is provided with a threshold clipper stage which is adjustable to pass energy in response to undulations produced from pulses of a width corresponding to the tuning of the resonant circuit. Should the pulses be of a width different from one-half the period of the frequency to which the circuit is tuned, the undulations thereof will be less than that required to produce conduction in the threshold clipper stage. Thus, pulses different from the desired width are blocked, pulse energy being passed by the clipper stage only in response to undulations produced from pulses of the desired width. The output of the pulse selector and shaper 32 is represented by pulses $S_1$ of graph 3*c*. These pulses $S_1$ may be employed to produce a wave 33 which corresponds in frequency to the base wave 23 of graph 2*a* produced at the west terminal. The wave 33 is used as a base wave source for the demodulating feature of the receiving terminal as will be made clear hereinafter.

The pulses $S_1$ are also employed for producing the deblocking pulse energy for selectively segregating the pulses of the other channels. This is effected by applying the pulse energy $S_1$ over line 34 to delay network 35 which is similar in character to the delay network 17 of the west terminal. The network 35 is provided with output connections 36, 37, 38, etc. to provide different amounts of retardation of the synchronizing pulses $S_1$ in accordance with the time spacing between the pulses of the successive channels. The delayed energy of the output 36 is applied to shaper 39 whereby the delayed pulse energy is shaped similarly as illustrated at 40, graph 3*d*. The retardation of the pulse 40 is shown to the $t_4$ which corresponds to the retardation $t_1$ of graph 2*d*. The pulse shapers 41 and 42 of the second and third receiving channels respectively, shape the pulse energy received from outputs 37 and 38 into pulses of the shape indicated at 43 and 44 respectively, in graph 3*d*. The retardations of the pulses 43 and 44 are shown as $t_5$ and $t_6$ respectively.

The pulses of graph 3*d* are employed for selective segregation of the pulses of channels 1, 2 and 3 in channel selectors 45, 46 and 47 respectively. The channel selectors comprise a mixer type of circuit having a threshold clipping level such as indicated at 48 in graph 3*e*. The pulse train indicated in graph 3*b* is applied from the output from the clipper-amplifier 28 over line 49 to each of the selectors 45, 46 and 47 where the pulse train is mixed with the appropriate selector pulses 40, 43 or 44, respectively. Graph 3*e* represents the pulse potentials resulting in the selector 45 for segregation of the pulses of channel 1. The selector circuit may also provide amplification of the pulse potentials occurring above the threshold clipping level 48 whereby pulses of a suitable amplitude for demodulating purposes are provided.

For demodulating purposes each receiving channel is provided with a demodulator 50 which may also comprise a form of mixer circuit to which the selected pulses of a desired channel are applied together with a harmonic of the base wave 33 produced at generator 51 from the synchronizing pulses $S_1$. The harmonic is selected from the wave 33 by a harmonic selector 52, the output of which is applied to phase shifter 53 whereby the harmonic wave may be shifted in phase so as to provide the linear portion of the wave, such as that portion adjacent the zero axis of the wave, in time relation with the pulses of the channel. It should be noted that wave 33 may be used directly instead of a harmonic thereof, the latter being preferred because of the steeper sides. Graph 3*f* illustrates the mixing of the potentials of the harmonic wave indicated at 54 shifted in phase by the amount $\theta$ and the pulses of channel 1 which are indicated as 1*a*, 1*b*, 1*c* etc. The demodulator 50 is provided with a threshold clipping level 55 whereby pulse potentials are produced varying in amplitude in proportion to the amount of time displacement of the pulses, as indicated for pulses 1*b* and 1*c* in graph 3*f*.

To illustrate this translation of time displacement into amplitude displacement, the pulses of channel 1 in graphs 2*g* and 3*b* are shown displaced in a varying manner. This position of pulse 1*a* represents one extreme position of time modulation, the position of pulse 1*b* represents a mid-point between two extreme positions of time modulation and the position of pulse 1*c* represents substantially the opposite extreme position of time modulation. It will be noted that the time modulation here illustrated is that of retardation with respect to the pulse position of pulse 1*a*. It will be understood, of course, by those skilled in the art that the time modulation for any given channel may follow a different principle depending upon the type of modulator circuit employed at the transmitter. The output of the demodulators 50 are applied to reproducer or utilization circuits where the audio component is reproduced in the usual manner.

For the return communication between the east and west terminals a like multi-channel transmitting and receiving system may be employed. According to the present invention, however, a double use of the delay networks 17 and 35 is made. For the return transmission of signals from the east terminal, pulse modulators 56, 57 and 58 are employed for the three channels, each having a signal source 59 and a pulse source taken from the delay network 35. The output connection 36 may be taken to provide the train of pulses for modulator 56 as indicated by line 60. Output connections 37 and 38 may also be used for the pulse sources for modulators 57 and 58 respectively. It will be noted, however, that if desired, these connections may be arranged differently if a different sequence of channel timing is desired in the return direction. It may also be desirable to provide a further signal channel in the place of the synchronizing channel which is not needed for the return trains, and in that case the pulses from line 34 may be applied to such additional transmitting channel.

The outputs of the three modulators are applied to a mixer 61 which provides an output train of interleaved channel pulses similarly as described in connection with the mixer 25. This output train of pulses may be transmitted over transmission medium 9, or over the radio link including transmitter 14 and receiver 12 by selectively positioning the switch 62. The reception of the train of channel pulses is made by a corresponding position of the switch 63, the pulses thereafter being applied to a clipper-amplifier 64 and thence to channel selectors 65, 66 and 67. The selectors are normally blocked similarly as the case of selectors 45, 46 and 47 and are deblocked by pulse energy taken from the delay network 17. The output connections of network 17 selected depending on the time differential between the timing of the pulses produced at 16 and the timing of the channel pulses received at the west terminal. Output connection 68 is taken by way of example to represent the required retardation timing of the pulses of generator 16 to provide deblocking pulses capable of deblocking the selector 65 for the pulses of one of the return channels. The pulse energy from output 68 is applied to a shaper 69 to produce a pulse of a width such as to include the maximum degree of time modulation of the pulses as hereinbefore described in connection with pulse 40 of graph 3*d*. From the foregoing description it will be clear that the channel selector 65 will pass only the pulses of the selected channel to the associated demodulator 70. The demodulator receives its demodulating wave from the base wave source 16 through a harmonic selector 71 the selected harmonic being shifted in phase by phase shifter 72 as may be desired. The demodulation is the same as hereinbefore described for demodulators 50, the pulse output of the demodulators being applied to reproducer or utilization circuits where the audio signal component is reproduced in the usual manner. The channel selecting and demodulating circuits of additional channels operate in the same manner as described, the deblocking energy being taken from appropriate output connections from network 17 and the selected harmonic from 71 being shifted in phase as required by the average timing of the signal pulses.

From the foregoing description it will be readily observed that the present invention provides a unique method of multi-channel pulse transmission and reception for each direction of communication between two given terminals, the timing of pulses for both interleaving of pulses for transmission and selective segregation for reception at each terminal being controlled through the same delay network. It is recognized, of course, that many variations and different embodiments may be made from the principles of this invention. For example, the channel selector stage and the demodulation stage of each receiving channel may be combined as a single mixer stage to which is applied a train of deblocking pulses, a demodulating wave and the train of channel pulses. It is therefore to be understood that this description is made only by way of example and not as a limitation on the scope of our invention as set forth in the objects thereof and the accompanying claims.

We claim:

1. A multichannel communicating system comprising a first terminal and a second terminal; said first terminal having a source of pulses, a first retardation means to retard by different amounts the energy of said pulses thereby producing a plurality of differently timed trains of pulses from said source, each train representing a channel for communication, means to render the pulses of one of the trains distinctive from the pulses of other trains for use as synchronizing pulses at said second terminal, modulator means to modulate a given characteristic of the pulses of each of said trains with signal intelligence, transmitter means for transmitting said trains of pulses in the form of a single train to said second terminal; and said second terminal having means to select the synchronizing pulses from said single train, second retardation means to retard by different amounts the pulse energy of the synchronizing pulses to provide different trains of selector pulses each train of which corresponds in time to one of the trains of channel pulses, a plurality of receiving channels each having a channel selector means, and means to apply thereto the selector pulses of a train having the proper timing for segregating from said single train those pulses of a desired channel, said second terminal including a plurality of sending channels each having pulse modulator means for modulating pulses according to signal intelligence, means for applying to said pulse modulator means differently timed output pulses from said second retardation means, and means to transmit the modulated pulses to said first terminal; and said first terminal includes a plurality of receiving channels each having a channel selector means, and means for applying to the different selector means differently timed output pulses from said first retardation means, the timing of these output pulses being selected to coincide with the pulses of a given channel of pulses from said second terminal.

2. A multi-channel communicating system comprising a first terminal and a second terminal; said first terminal having a source of wave energy, means to produce a train of pulses from said wave energy, a first retardation means to retard by different amounts the energy of said pulses thereby producing a plurality of differently timed trains of pulses from said source, each train representing a channel for communication, means to render the pulses of one of the trains distinctive from the pulses of other trains for use a synchronizing pulses at said second terminal, modulator means to time modulate the pulses of each of said trains with signal intelligence, transmitter means for transmitting said trains of pulses in a common medium to said second terminal; said second terminal having means to separate the synchronizing pulses from the pulses of other channels, second retardation means to retard by different amounts the pulse energy of the synchronizing pulses to provide different trains of selector pulses each train of which corresponds in time to one of the trains of channel pulses, a plurality of receiving channels each having channel selector means, means to apply thereto the selected pulses of a train having the proper timing for selective reception of those pulses of a desired channel, demodulator means for translating the time modulations of the pulse of the selected channel into an audio component, said last named means including means for producing a demodulating wave in response to said synchronizing pulses, a plurality of sending channels each having pulse modulator means for modulating pulses according to signal intelligence, means for applying the different timed output pulses of said second retardation means to the last-named pulse modulator means, and means to transmit the modulated pulses to said first terminal; and said first terminal further includes a plurality of receiving channels each having a channel selector means, means for applying to the different selector means differently timed output pulses from said first retardation means, the timing of these output pulses being selected to coincide with the pulses of a given channel of pulses from said second terminal, each receiving channel having a demodulator for translating the time modulation of pulses of a received channel into audio wave form, and means to apply wave energy from said wave source to the demodulators of said receiving channels.

EMILE LABIN.
DONALD D. GRIEG.

REFERENCES CITED

The following references are of record in the file of this patent:

UNITED STATES PATENTS

| Number | Name | Date |
|---|---|---|
| 2,043,081 | Riggs | July 21, 1936 |
| 2,172,354 | Blumlein | Sept. 12, 1939 |
| 2,199,634 | Koch | May 7, 1940 |
| 2,262,838 | Deloraine et al. | Nov. 18, 1941 |
| 2,266,401 | Reeves | Dec. 16, 1941 |
| 2,273,163 | Wilson | Feb. 17, 1942 |
| 2,391,776 | Fredendal | Dec. 25, 1945 |
| 2,395,467 | Deloraine | Feb. 26, 1946 |
| 2,403,210 | Butement | July 2, 1946 |
| 2,418,116 | Grieg | Apr. 1, 1947 |